3,226,293
OCTADECYL AMINE ANTHELMINTIC
COMPOSITIONS AND THERAPY
Joseph J. Ursprung, Kalamazoo, Mich., assignor to Chas. Pfizer & Co. Inc., New York, N.Y., a corporation of Delaware
No Drawing. Filed Dec. 21, 1961, Ser. No. 161,311
7 Claims. (Cl. 167—55)

This application is a continuation-in-part of application Serial No. 668,314, filed June 27, 1957, now abandoned.

This invention relates to a new group of therapeutic agents useful in the treatment of helminthic infections and to the therapeutic treatment of such conditions with these agents. More particularly, this invention relates to the use of alkylamines and their salts in the treatment of helminthiasis.

Helminthic infections are among the most common disease conditions in the world today. They involve infestation of the body of animals and human beings with various types of parasitic worms known as helminths. The public health significance of these organisms and the economic losses brought about by infestation of humans, household pets and domestic animals have resulted in extensive research for new and more effective anthelmintics.

However, despite the countermeasures developed by such research, the significance of anthelmintics has not decreased. On the contrary, it has increased by virtue of the greater knowledge of the magnitude of helminthous infections in tropical countries and the difficulty with which prophylactic measures are accepted.

A wide variety of agents has been used for the treatment of helminthiasis. These include herb preparations such as arecoline, aspidium, and chenopodium, heavy metal compounds like antimony and arsenic compounds; phenolic substances including thymol and hexylrescorcinol and a number of synthetic materials. Many of these have fallen into disrepute due to their toxicity, low activity and/or limited anthelmintic spectrum. Indeed there are a number of disease-producing helminths that are resistant to all presently known agents and methods of therapy. Any addition to the anthelmintic armamentarium useful against such organisms would be indeed welcome. Even more welcome would be a broad spectrum anthelmintic. Thus, a definite need exists for effective, inexpensive, well-tolerated anthelmintic agents and particularly ones which are not only effective against these resistant species but broad in spectrum.

Recently piperazine and some of its derivatives have come into favor as anthelmintic agents. The actvity of piperazine, however, is limited primarily to pinworm infestations (oxyuriasis) and large round worm infestations (ascariasis). Among the untoward side effects of many prior art anthelmintics are diarrhea, urticaria, vomiting, blurred vision, and general muscle weakness. Further, many anthelmintics are quite rapidly absorbed from the gastro-intestinal tract. This, of course, is disadvantageous since helminthic infestations are frequently seated in the intestinal tract, and it is important to maintain therapeutic levels of the drug in these organs.

Anthelmintic agents now in use are specific in their action, both with respect to the helminth and to the host. The indiscriminate application of the term "anthelmintic" to drugs which have a toxic action upon parasitic worms belonging to more than one animal phylum erroneously conveys the impression that the organism being acted upon belongs to a biological classification comparable to that which encompasses bacteria or fungi since these organisms are subject to attack by antibacterial and antifungal agents. However, this is not the case. Roundworms and flatworms belong to different animal phyla and there is no reason to believe that an anthelmintic effective against *Ascaris lumbricoides* (phyla, nematodes) will have an effect on *Hymenolepsis nana* or *Taenia saginata* (phyla, platyhelminths). Indeed, activity against one phylum cannot be extrapolated to another phylum.

The screening procedures employed in the evaluation of potential anthelmintic agents involve in vitro tests with worms of different types with respect to a stimulating, paralyzing or killing effect. The agents selected in this manner are then, if their solubility, toxicity and stability in the animal body warrants, investigated further in worm-infected animals.

The shortcomings of the in vitro tests become obvious when one considers the following points: the drug may be absorbed or chemically altered before it reaches the helminths; the helminth may be coated with mucus or other substance which serves as a barrier to drug penetration; the physical location of the helminth may be such that the drug does not reach it. The location of the helminth in the host, in fact, constitutes an important reason for the specificity of anthelmintic agents. Moreover, the effectiveness of anthelmintic agents against the same or closely related worm species varies greatly from host to host.

In vivo studies in animal parasites as a means of determining anthelmintic activity against definite species of human parasites are subject to many of the same objections as in vitro studies. Different species or varieties of parasites, great differences in the anatomy and physiology of the intestinal tracts of the hosts, varying food habits and different intestinal contents serve to complicate the experiments. The drug must be tested against the particular helminth in the particular host in order to obtain definitive results.

There is at present no broadly effective anthelmintic drug. While more than one roundworm may be susceptible to a given drug, no drug is recommended for oral therapy against both tapeworms and roundworms.

It is an object of this invention to provide novel anthelmintic dosage forms which are particularly effective, nontoxic and characterized by broad spectrum and high levels of activity for extended periods of time. A further object is to devise new and improved methods for treating helminthiasis, particularly cestoidiasis, in animals and humans. Other objects will become apparent from the ensuing description of the invention.

These objects are realized by the provision of anthelmintic compositions comprising certain alkyl amines and their salts in pharmaceutically acceptable carriers. The useful amines are those having the formula

and the acid addition salts thereof wherein $R_1$ and $R_2$ may be the same or different and are selected from the class consisting of hydrogen, methyl and ethyl; $R_3$ is a monovalent alkyl radical having from 15 to 20 carbon atoms. Thus, a particularly valuable anthelmintic agent comprises an orally administrable carrier and an alkylamine, or acid addition salt thereof, of the above mentioned formula, such as N,N-diethyloctadecylamine, N,N-dimethyloctadecylamine, octadecylamine per se, N-methyl-N-ethyl-octadecylamine, N-monomethyloctadecylamine, or N-monoethyloctadecylamine, hexadecylamine, pentadecylamine, N,N-dimethylpentadecylamine or mixtures of two or more of these. Such compositions are especially effective in treating infestations of tapeworms.

Further, the compounds of the above formula are especially effective in the treatment of nematodal, e.g. pinworm, whipworm and roundworm, infections in both man and animals. This is indeed surprising in view of the teaching of Anderson et al. [Arch. Exper. Path. u. Pharmacol. 219, 119–129 (1953)], that although dodecylamine has good in vitro activity versus *Ascaris lumbricoides* of swine, tetradecylamine is of considerably inferior activity and decylamine is of decidedly inferior activity even to tetradecylamine.

Use of these compositions for the treatment of helminthiasis in man and animals involves intestinal contact of the infecting helminth with the drug. Dosage is preferably by the oral route, since the major site of infection is ordinarily the intestinal tract. It is of course possible to administer these drugs rectally, but this method is not so convenient as oral medication. One of the attributes of these new drugs is that they are highly effective orally. The daily dose required varies with the particular composition employed and the animal or human being treated.

For the treatment of domestic animals, a single dose of one of the new compositions containing an amount of the amine from about 75 to 300 mg./kg. of body weight is generally sufficient to clear the animal of the infecting parasite. Doses as low as 10–25 mg./kg. can be used if repeated on three or more consecutive days. Generally higher dosage levels are preferred for pinworm infestations than are necessary in treating tapeworms, from about 100 to 200 mg./kg. for tapeworms and from about 175 to 275 mg./kg. for pinworms being most satisfactory. Administration of the compositions to animals can best be effected by mixing the drug with the food. Thus, the required dose for the animal is calculated on the basis of the above formula and the drug is then blended with all or a portion of the animal's daily ration. Since the alkylamines are liquids or low melting solids, they are advantageously used in the form of a suitable acid addition salt. Indeed, the use of a salt of the alkylamine is preferred since it facilitates the preparation of compositions, especially of solid compositions. Further, the use of a salt permits a wide choice as to solubility characteristics and taste.

In humans, as with animals, the dosage varies with the size of the patient. Two courses of treatment with the anthelmintic dosage form, each lasting approximately one week separated by a rest period of about one week, are preferred for the treatment of pinworm, for example. A single course of treatment may be used, especially with other infestations like tapeworms. For infants weighing less than 15 pounds a daily dose of 75 mg. is recommended. For children weighing between 15 and 60 pounds, twice this dosage is employed. With adults, and large children (over 60 lbs.) two to four 150–500 mg. doses per day during each course of treatment are preferred. Thus, the useful dosage range for humans is from about 75 mg. to about 2 g. per day or from about 10 to 75 mg./kg. per day.

For human and household pet dosages, the alkylamines and their salts can be compounded into any of the usual oral dosage forms including capsules, boluses, tablets, and liquid preparations such as elixirs and suspensions containing various coloring, flavoring, and taste masking substances. The active anthelmintic ingredient for this purpose can be diluted with various tableting materials such as starches of various types, calcium carbonate, lactose, sucrose, and dicalcium phosphate to simplify the tableting and capsuling process. A minor proportion (1–2%) of magnesium stearate is useful as a lubricant. For children it is convenient to prepare the tablets containing between 35 and 150 mg. of the amine per tablet. For adults larger tablets containing up to about 500 mg. of active ingredient are useful. It is generally considered desirable to avoid tablet weights in excess of about 700 mg. The amount of active ingredient then varies from about 5 to 70% of the total tablet weight. With capsules of various types, the proportion of carrier is of less importance.

As aforesaid, salts of the specified alkylamines may be employed in these new compositions, as well as the basic amines. For instance, hydrohalide addition salts such as the hydrobromides, hydrochlorides and hydroiodides are particularly useful. Also operable are the salts with acids such as sulfuric, phosphoric, citric, tricarballylic, acetic, stearic, maleic, fumaric, succinic, tartaric, sulfosalicylic, p-toluene sulfonic, 2,4-dichlorophenol, 6-azauracil, lauric, 5,6,7,8-tetrahydro-1-naphthol and 4-hexylresorcinol.

For the preliminary anthelmintic evaluation of the valuable compositions of the present invention, a group of mice infected with pinworm (*S. obvelata*) was used. The test mice were readily infected by associating them with naturally infected mice known as source mice. The experimental mice acquired their infections over a number of days and therefore harbored worms in several stages of development when treated with the test compounds. This technique is described by Kam-Fai Chan in The American Journal of Hygiene, volume 56, pages 22–30 (1952). The test mice were housed for a period of eight days with the source mice, during which time they too became infested with the pinworm, which is very similar in its host-parasite relationship to the nematodes of human and veterinary importance. On the eighth day after exposure to the source mice, the alkylamine dosage forms under study were administered to the test mice by the oral route. Single doses of 250 mg./kg. for the pinworm-infested mice were employed. The treated mice and untreated control groups were then sacrificed on the ninth day, and all stages of *S. obvelata* in the cecum were counted. The test for activity against tapeworms was run in mice with the organism *Hymenolepsis nana*. The mice were first treated prophylactically on the first three days of the experiment and then inoculated orally with ova of *H. nana*. The mice were then held until ova occurred in feces of the controls, generally the fourteenth day. Therapeutic treatment was then started and continued for three days. The animals were sacrificed and examined for helminths.

Results of these tests against the parasite *Hymenolepsis nana* are tabulated in Table I in terms of the ratio of cleared:treated mice for representative alkylamines and salts thereof.

TABLE I.—ACTIVITY AGAINST *H. NANA*

| $R_1$ | $R_2$ | $R_3$ | Acid salt | Dose, mg./kg. | Cleared/treated |
|---|---|---|---|---|---|
| H | H | n-Hexadecyl | Citric | 250 | 5/5 |
| H | H | do | 6-azauracil | 250 | 4/5 |
| H | H | do | Acetic | 200 | 10/10 |
| $CH_3$ | $CH_3$ | do | Hydrochloric | 250 | 4/5 |
| H | H | n-Octadecyl | Acetic | 200 | 15/15 |
| H | H | do | Citric | 250 | 4/5 |
| | H | do | 6-azauracil | 250 | 4/4 |
| $CH_3$ | $CH_3$ | do | Tricarballylic | 250 | 5/5 |
| $CH_3$ | $CH_3$ | do | Citric | 250 | 4/5 |
| $CH_3$ | $CH_3$ | do | 2,4-dichlorophenol | 250 | 4/5 |
| $CH_3$ | $CH_3$ | do | 5,6,7,8-tetrahydro-1-naphthol | 250 | 4/5 |
| $C_2H_5$ | $C_2H_5$ | do | | 200 | 9/10 |

The activity against tapeworms of N,N-dimethyloctadecylamine hydrochloride was also measured at lower dosage levels under the same conditions.

Dose (mg./kg. body wt.):    No. cleared/No. treated
200 ---------------------------------- 9/9
100 ---------------------------------- 8/10
25 ----------------------------------- 1/10

A representative N,N-diethyloctadecylamine hydrochloride composition was also evaluated further in mice infected with *Hymenolepsis nana*. After five days of infestation a dosage level of 200 mg./kg. of the amine resulted in 90% reduction of the worm burden. After twenty days of infestation, this same dose gave 100% worm reduction, while a 100 mg./kg. dose gave 50% reduction.

The broad anthelmintic spectrum of the herein described compounds is exemplified by the following data obtained using N,N-dimethyloctadecylamine hydrochloride as representative of these compounds in human therapy.

TABLE II.—ANTHELMINTIC ACTIVITY OF N,N-DIMETHYLOCTADECYLAMINE HYDROCHLORIDE

| Parasite | No. of cases treated | Percent cured |
|---|---|---|
| Taenia saginata (tapeworm) | 14 | 64.3 (9/14) |
| Hymenolepsis nana (tapeworm) | 21 | 71.4 (15/21) |
| Ascaris lumbricoides (roundworm) | 29 | 79.3 (23/29) |
| Trichuris trichiura (whipworm) | 21 | 90.5 (19/21) |

In addition, other studies on the efficacy of this compound in human therapy showed that 20 of 25 cases of tapeworm infection and 44 of 52 cases of roundworm infection responded positively to this therapy. No significant intolerance was noted in any of the above cases.

The following examples are given simply to illustrate this invention but not in any way to limit its scope:

Example I

A pig weighing 60 pounds was diagnosed as being infested with tapeworms by examination of its feces by the flotation method. One and one-half grams of N,N-dimethyloctadecylamine were then mixed with the animal's daily ration which was entirely consumed by the animal. After about 72 hours no further ova were detectable in the feces. The animal was sacrificed and found to be free of the helminth on post mortem examination.

In another instance, a pig of similar size, also diagnosed as being infested with tapeworms, was treated with 3 g. of N-methyl-N-ethyloctadecylamine in this fashion and found to be cleared of the helminth as above.

Example II

One half gram of octadecylamine was blended with an equal weight of lactose and sealed in a paper envelope. This composition was then employed for mixing with the daily ration of a 30 pound dog for the successful treatment of a nematode infestation.

Example III

N,N-dimethyloctadecylamine hydrochloride was administered orally in capsule form to persons infected with various types of helminths. In some instances polyparasitosis was present. A regular regimen was followed with respect to each person, the drug being administered on a mg./kg. of body weight basis at the rate of 2 to 3 capsules per day, generally for a 5 day period. Pertinent data are tabulated below.

| Type of infection | Kg./weight | Capsules/day×days of treatment | Mg./kg./day |
|---|---|---|---|
| T. saginata | 51 | 3×6 | 2.94 |
| T. saginata | 56 | 3×5 | 2.68 |
| T. saginata | 62 | 3×6 | 2.42 |
| A. lumbricoides | 23 | 2×5 | 2.15 |
| A. lumbricoides | 24 | 2×5 | 4.16 |
| A. lumbricoides | 25 | 2×5 | 4.00 |
| H. nana | 25 | 2×5 | 4.00 |
| H. nana | 26 | 2×5 | 3.84 |
| H. nana+T. trichiura | 27 | 2×5 | 3.70 |
| H. nana+T. trichiura | 30 | 2×5 | 3.30 |
| A. lumbricoides+T. saginata | 31 | 2×5 | 3.22 |
| A. lumbricoides+T. saginata | 25 | 2×6 | 2.40 |
| A. lumbricoides+T. trichiura | 30 | 2×6 | 3.33 |
| A. lumbricoides+T. trichiura | 28 | 2×5 | 3.50 |

Examination of the feces of the test subjects showed complete or almost complete cure as determined by the absence of ova in the feces even in those cases of polyparasitosis. No toxic signs or effects were noted in any of the subjects.

Example IV

Repetition of the procedure of Example II with the following alkylamines as their hydrochloride salts in place of octadecylamine successfully cleared dogs, varying in weight from about 25 pounds to 35 pounds, of a nematode infestation:

Pentadecylamine
n-Hexadecylamine
N-methyl-N-ethylhexadecylamine
N,N-dimethylnonadecylamine
N,N-diethyleicosylamine
N,N-diethylhexadecylamine
N-ethylhexadecylamine
N,N-dimethylheptadecylamine
Eicosylamine
N,N-dimethyleicosylamine The acetate, sulfosalicylate, citrate, laurate, maleate and 2,4-dichlorophenolates are likewise effective in clearing dogs of a nematode infection.

Example V

The following materials were thoroughly blended and then compressed into tablets containing 30 mg. of N,N-diethyloctadecylamine per tablet.

|   | Grams |
|---|---|
| N,N-diethyloctadecylamine | 3 |
| Lactose | 28.7 |
| Magnesium stearate | 0.3 |

Example VI

Sheep infected with a cestode infection are administered a single dose of one of the following alkylamines or of their salts. A weight of alkylamine salt equivalent to 150 mg. of free amine per kg. of body weight is used. After about 72 hours, no further ova are found in the feces. For convenience the values of the R terms and the particular salt used are presented in tabular form:

| $R_1$ | $R_2$ | $R_3$ | Salt |
|---|---|---|---|
| $CH_3$ | $CH_3$ | Octadecyl | Hydrochloride. |
| $CH_3$ | $CH_3$ | do | Sulfosalicylate. |
| $CH_3$ | $CH_3$ | do | p-Toluenesulfonate. |
| $CH_3$ | $CH_3$ | do | Citrate. |
| H | $CH_3$ | do | Hydrochloride. |
| H | $CH_3$ | do | Citrate. |
| H | $CH_3$ | do | Acetate. |
| H | H | do | Gluconate. |
| H | H | do | Hydrochloride. |
| H | H | do | Do. |
| $CH_3$ | $CH_3$ | Hexadecyl | Acetate. |
| $C_2H_5$ | $C_2H_5$ | do | Gluconate. |
| $C_2H_5$ | $C_2H_5$ | do | Laurate. |
| H | H | do | 6-azauracilate. |
| $CH_3$ | H | Pendadecyl | 2,4-dichlorophenate. |
| $CH_3$ | $CH_3$ | do | Hexylresorcinolate. |
| H | H | Eicosyl | Hydrochloride. |
| H | H | do | Malate. |
| H | $CH_3$ | Heptadecyl | 5,6,7,8-tetrahydro-1-naphtholate. |

Example VII

To a commercially available raspberry-flavored sugar syrup was added the equivalent of 100 mg. of N-monoethyloctadecylamine per milliliter, and the mixture was homogenized in a mechanical device for this purpose. Daily administration of one half teaspoonful of the resulting elixir per day for a period of 14 days successfully cleared a 30 pound child of a pinworm infestation.

Example VIII

A pig weighing approximately 60 pounds infested with both tapeworms and pinworms was successfully treated according to the method of Example I employing a single dose of 3 g. of N-monoethyloctadecylamine admixed with the animal's daily ration. In like manner, N-monomethylpentadecylamine, heptadecylamine and nonadecylamine are successful in ridding the animal of both parasites.

*Example IX*

The following materials were thoroughly blended and then compressed into tablets each containing 125 mg. of N,N-diethyloctadecylamine as the hydrochloride salt. The total tablet weight was 500 mg.

|  | Grams |
|---|---|
| Amine | 12.5 |
| Starch | 12.5 |
| Lactose | 24.5 |
| Magnesium stearate | 0.5 |

Four of these tablets taken daily for five days in two doses per day was sufficient to clear a 60 pound child of a tapeworm infestation.

Similar tablets, containing respectively the hydrobromide and hydroiodide salts of the same amine in lieu of the hydrochloride were also similarly effective.

*Example X*

Cereal-type medicated feeds suitable for administration to hogs were prepared containing in one N-methyl-N-ethyloctadecylamine hydrochloride, and in the other octadecylamine hydrobromide, in such quantities that ¼ of the animal's daily ration contained 40 mg./kg. of body weight of the particular amine. These were then fed to infected animals for the successful treatment of tapeworms. The balance of the diet was the usual nutritionally balanced feed stuff on hand.

*Example XI*

Aqueous suspensions were prepared, each containing 50 mg. per teaspoonful (5 ml.) of each of the amines employed in Examples I through IX, in a vehicle composed of U.S.P. simple syrup containing the following materials per 100 ml. of vehicle.

| F.D. & C. yellow No. 5 | mg | 5 |
|---|---|---|
| Carboxymethylcellulose, low viscosity type | mg | 1 |
| Synthetic lemon flavor (Fritche) | ml | 0.1 |

These suspensions were particularly well adapted for administartion to children unable or unwilling to swallow tablets or capsules.

What is claimed is:

1. A process for treating helminthic infestations of man and animals which comprises orally administering to the helminth infected host a therapeutically effective amount of an amine selected from the group consisting of those having the formula

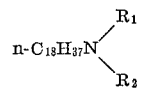

wherein $R_1$ and $R_2$ are selected from the class consisting of hydrogen, methyl and ethyl and the pharmaceutically acceptable acid addition salts thereof, together with a pharmaceutically acceptable carrier.

2. A process for treating helminthic infestations in humans, which comprises orally administering to the infected host an amine selected from the group consisting of those having the formula

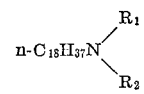

wherein $R_1$ and $R_2$ are selected from the class consisting of hydrogen, methyl and ethyl and the pharmaceutically acceptable acid addition salts thereof, together with a pharmaceutically acceptable carrier, at a dosage per day of the amine of between about 10 and about 75 mg./kg. of body weight.

3. A process for treating helminthic infestations in animals which comprises orally administering to the helminth infected host between about 75 and about 300 mg./kg. of body weight of an amine selected from the group consisting of those having the formula

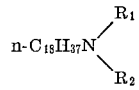

wherein $R_1$ and $R_2$ are selected from the class consisting of hydrogen, methyl and ethyl and the pharmaceutically acceptable acid addition salts thereof, together with a pharmaceutically acceptable carrier.

4. An orally administrable anthelmintic composition comprising as the sole pharmaceutically active ingredient an amine selected from the group consisting of those having the formula

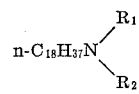

wherein $R_1$ and $R_2$ are selected from the class consisting of hydrogen, methyl and ethyl, and the pharmaceutically acceptable acid addition salts thereof, together with a pharmaceutically acceptable carrier, said composition containing sufficient of said amine to provide a daily dosage thereof from 75 mg. to 2000 mg.

5. A composition according to claim 4 wherein the carrier is an inert, finely divided solid.

6. A composition according to claim 4 in unit dosage form, wherein the amine is present in an amount from about 35 mg. to about 700 mg. and the carrier is an aqueous liquid.

7. An orally administrable anthelmintic composition for veterinary use comprising an animal feed having uniformly distributed therein as the sole pharmaceutically active ingredient a small proportion of an amine selected from the group consisting of those having the formula

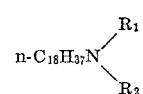

wherein $R_1$ and $R_2$ are selected from the class consisting of hydrogen, methyl and ethyl and the pharmaceutically acceptable acid addition salts thereof, the amount of said amine based on the average daily food intake being sufficient to provide a daily dose of at least about 10 mg./kg. of body weight.

References Cited by the Examiner

UNITED STATES PATENTS 2,503,663    4/1950    Gericke _____ 99—154

FOREIGN PATENTS 306,623    7/1955    Switzerland.

OTHER REFERENCES

Anderson et al.: Naunyn-Schmiedebergs Arch. Exptl. Pathol. Pharmakol., 219, pp. 119–29 (1953) (in English).

Chemical Abstracts, 53, p. 10648f, 1959.

Corral et al.: Anales Asoc. Quim. Argentina, vol. 43, pp. 173–179 (1955), through Chem. Abstr. 50, p. 12936a.

FRANK CACCIAPAGLIA, JR., *Primary Examiner.*

LEWIS GOTTS, *Examiner.*